Oct. 21, 1969  R. R. SNOW  3,473,908
SULFUR TRIOXIDE GLASS SURFACE TREATMENT PROCESS
Filed Aug. 18, 1966
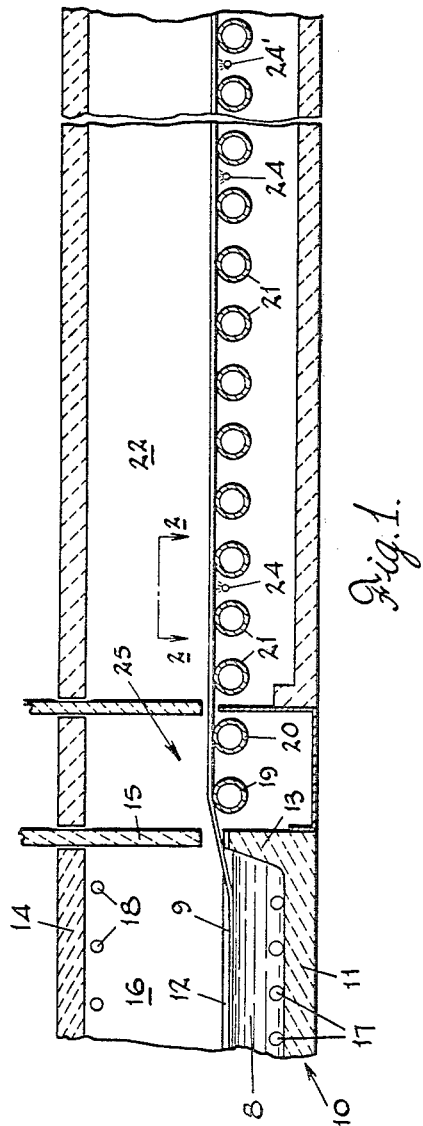
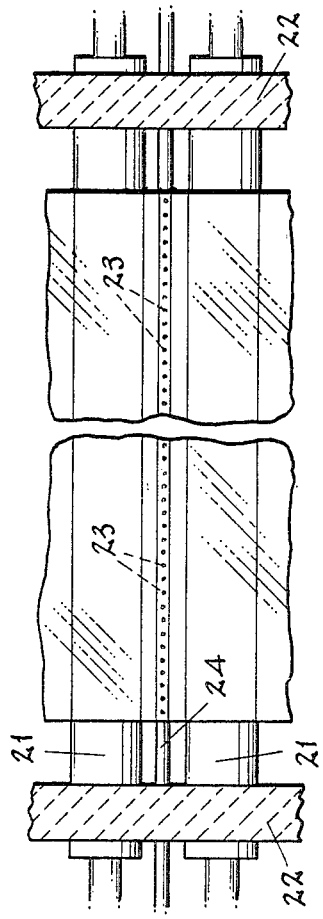
INVENTOR.
Richard R. Snow
BY Nobbe & Collins
ATTORNEYS United States Patent Office 3,473,908
Patented Oct. 21, 1969

3,473,908
SULFUR TRIOXIDE GLASS SURFACE
TREATMENT PROCESS
Richard R. Snow, Perrysburg, Ohio, assignor to Libbey-Owens-Ford Company, a corporation of Ohio
Filed Aug. 18, 1966, Ser. No. 573,249
Int. Cl. C03b *18/02;* C03c *23/00*
U.S. Cl. 65—99                                                         8 Claims

ABSTRACT OF THE DISCLOSURE

Treating a glass ribbon produced according to the float process to prevent development, upon subsequent reheating for fabricating purposes, of a white iridescent haze on the surface which has been in contact with the molten metal, by exposing the surface to vapors of sulfur trioxide after the ribbon has been lifted from the bath and before annealing thereof is completed.

---

The present invention relates broadly to the treatment of glass to prevent the subsequent development of defects therein. More particularly it is concerned with a special treatment for so-called "float" glass as a preliminary to heat-processing or heat-fabricating such glass.

By means of this invention it is possible to bend, temper, film and otherwise heat-process float glass without creating certain objectionable defects in the resulting fabricated products that have come to be considered characteristic of such products when made from float glass.

To explain, float glass is flat glass produced by the relatively new "float" process described in U.S. Patent No. 3,083,551, granted Apr. 2, 1963, and in which glass, either in the molten state or as a preformed ribbon, is delivered at a controlled rate onto a bath of molten metal, such as tin, and subjected while on the bath to thermal and physical conditions which assure (1) that a body of molten glass will be established on the surface of the metal bath; (2) that the molten glass in this body will be free to flow laterally and develop into a buoyant layer of stable thickness and (3) that as the layer of stable thickness develops it will be advanced in ribbon form over the surface of the metal bath and gradually cooled until it can be removed unharmed by mechanical means.

Normally, this produces an ultimate ribbon of a thickness essentially the same as the stable or equilibrium thickness of the glass, but a thinner ultimate ribbon may be produced as, for example, by increasing the speed of the mechanical conveying means that removes the ribbon from the bath so that the increased tractional effort will attenuate the layer of stable thickness as it is advanced over the molten metal.

The float glass so produced is flat, of generally uniform thickness, free of surface distortions and possesses a natural luster similar to a "fire finish." Indeed, it has been said to compare favorably with plate glass in appearance, without having required the expensive and time consuming grinding and polishing steps.

Consequently, float glass originally appeared to offer an ideal starting material from which to fabricate such specialty glass products as bent glass, tempered glass, filmed glass and the like. However, it was soon found that when conventional float glass is reheated to the temperatures (above 1000° F.) required for bending, tempering, and in much filming of glass, it very often develops what, under normal inspection, appears to be a white, iridescent haze on the surface that has been in contact with the molten metal. For example, in an actual production trial in a bending and tempering furnace, 84.5% of a randomly selected group of float glass parts developed this defect during fabricating into bent, tempered, automotive backlights and, when it is realized that these parts had to be completely fabricated before the defect was noted or could be detected, the seriousness of the problem from a commercial standpoint can be readily appreciated.

Moreover, although to the naked eye the defect resembles a white haze, it is apparent upon examination of the actual surface condition that a considerable change in the volume or expansion of a thin layer of surface glass has taken place because, under the microscope, the defect is seen to be a mass of surface irregularities with the defective area being undulating or wrinkled and containing innumerable discontinuous, randomly oriented lines that can only be removed by mechanical abrasion.

The exact mechanism involved in the formation of this heat-created defect is not definitely known but work to date suggests that it results from the oxidation of stannous oxide at the surface of the glass to stannic oxide. The theory behind this is that tin from the conventional float bath diffuses into the surface of the ribbon moving over it, entering the glass as the stannous form from stannous oxide vapors released from the molten bath which contains small amounts of dissolved oxygen; and that, upon subsequent reheating of the float glass above 1000° F., the stannous oxide at the glass surface is converted to stannic oxide due to the instability of stannous oxide at elevated temperatures and the availability of oxygen in the atmosphere.

Regardless of how it is caused, however, the development of such a surface defect, during heat-treatment or heat-fabricating is prevented, according to this invention, by treating a glass surface that has been in contact with molten metal with $SO_3$ gas prior or preliminary to any reheating of the glass.

Just what this $SO_3$ treatment does is also not completely understood but it appears that the chemistry involved consists of the $SO_3$ gas reacting with the sodium oxide available in the glass surface to form sodium sulfate according to the following equation:

$$Na_2O + SO_3 \rightarrow Na_2SO_4$$

and that the effectiveness of the treatment may be due to the chemical reaction's depleting the surface layer of the glass of $Na_2O$ with the result that the stannous oxide present in the surface layer becomes more involved as a glass network modifier and so is no longer capable of combining with oxygen in the atmosphere during subsequent reheating of the glass.

In any event, it is a primary object of this invention to provide a treatment for glass after it has been in contact with molten metal that will prevent surface defects from developing in the glass when the glass is reheated.

Another object is the provision of a treatment of this character that can be carried out during and as part of conventional procedures for producing float glass.

Still another object is to provide suitable and efficient procedures and apparatus for effectively carrying out such treatment.

Other objects and advantages of the invention will become more apparent during the course of the following description, when taken in connection with the accompanying drawings.

In the drawings, wherein like numerals are employed to designate like parts throughout the same:

FIG. 1 is a longitudinal, vertical, sectional view through the discharge end of the forming and the entrance end of the annealing zone of a continuous float glass machine, showing apparatus for treating the float ribbon in accordance with the invention; and FIG. 2 is a fragmentary, horizontal, sectional view taken substantially along the line 2—2 in FIG. 1.

Referring now more particularly to the drawings, there has been illustrated therein the discharge end and associated parts of a float glass producing apparatus such as is described in U.S. Patent No. 3,083,551. As best seen in FIG. 1, the float bath of molten metal 8, upon which the float glass ribbon 9 has been formed and over which it moves, is contained in a tank 10, which includes a bottom 11, side walls 12 and end walls 13, and supports an overhead structure including a roof 14, a vertically adjustable end wall 15 and side walls 16 providing a tunnel over the molten metal bath 8 and defining a headspace.

The temperature of the molten metal bath in the tank is regulated to provide temperatures varying from 1800° F. or higher at the inlet end (not shown) to around 1200° F. or lower at the discharge end illustrated in FIG. 1 and this may be done in any of a number of different ways including the use of thermal regulators immersed in the molten metal, as indicated at 17, or in the roof or headspace, as indicated at 18.

At temperatures around 1200° F. the glass in the float ribbon 9 has a viscosity of about $10^8$ poises and is sufficiently stiffened to allow its removal without harm from the molten metal bath 8 by passage over a lift out roll 19, support roll 20 and lehr rolls 21.

Tractive force for advancing the ribbon to progressively remove it from the float bath and pass it into and through the annealing lehr 22 may be provided by driving a part or all of the rolls 19 through 21 and/or by the provision of one or more cooperating superimposed rolls (not shown).

Now, as indicated above, there are obvious practical and commercial advantages in carrying out the $SO_3$ treatment of this invention in and as part of a conventional float glass operation and the procedures of the invention lend themselves particularly well to such an operation.

Thus, it has been found in extensive laboratory work and severe tests that the gas concentration during the $SO_3$ treatment is not of special importance because low concentrations, well under 2%, are completely adequate to prevent the defect so long as good contact between the gas and the glass surface being treated is maintained.

On the other hand the success of the treatment is both time and temperature dependent with temperatures below 500° F. and above 1250° F. being generally undesirable, the former because the treatment at lower temperatures requires an excessive amount of time and the latter because the treatment at higher temperatures may produce sodium sulfite and a resultant surface etching of the glass.

However, within the temperature range of 500° to 1250° F., exposure of the susceptible surface of a float glass sheet to $SO_3$ gas for a sufficient length of time will completely prevent the development of the previously encountered defect during any subsequent bending, tempering, filming or similar heat fabricating of the glass; and the required exposure time is dependent on the temperature.

For example, sheets of float glass treated by exposing them to $SO_3$ vapors for 15 minutes at 750° F. developed no defect when subsequently reheated for 15 minutes at 1350° F., although 15 minutes is considerably longer than is required for most commercial heat fabricating processes and an untreated control sheet developed a very heavy, uniform defect under the same conditions.

Similarly, float glass sheets, treated by exposing them to $SO_3$ vapors for 5 minutes at 800° and 900° F. respectively, developed no defects when subsequently reheated for 10 minutes at 1350° F.; and sheets treated for 5 minutes at 900° F. and for 1 minute at 900° and 1000° F. respectively developed no defects when subsequently reheated to 1350° F. for 15 minutes. Moreover, the sheets that were treated for 5 minutes at 900° F. and for 1 minute at 1000° F. developed no defect even when the reheating at 1350° was extended to 45 minutes.

Additionally sheets of float glass, treated by exposure to $SO_3$ vapors while cooling from an actual glass temperature of 1010° F. to 500° F. during a period of approximately 9 minutes, developed no defects when subjected to the standard reheating test (10+ minutes at 1350° F.).

In the light of this it was determined that the entrance end of a conventional float glass lehr such as shown at 22 in the drawings would provide a completely adequate environment for carrying out the treatment of the invention. In the first place the lehr is a substantially enclosed tunnel-like chamber; second it has a temperature that decreases gradually from around 1080° F. at the hot or entrance end; third it has a temperature between 1080° F. and 500° F. for approximately the first 210 feet of its length through which the float ribbon moves for about 11 minutes with glass of approximately ¼" thickness. And, finally, the natural drafts in this type of lehr are such that a gas introduced into any part of their tunnel-like chambers tends to move toward and to accumulate in the hot end.

According to one preferred embodiment, the invention is practiced by directing $SO_3$ gas toward the undersurface of a float glass ribbon through openings 23 in pipes 24 positioned transversely of the lehr and just below the path of travel of the glass. Preferably the pipes 24 are located within the length of the lehr where the temperature is upwards of 500° F. For example, excellent results have been obtained with one pipe 24 located between the 8th and 9th lehr rolls which the float ribbon required approximately 51 seconds to reach after it entered the lehr and where the temperature was around 1060 F. and a second pipe 24' located between the 16th and 17th lehr rolls, requiring about twice as long to reach and where the temperature was in the neighborhood of 1045° F. $SO_3$ gas was supplied with this arrangement by feeding 5 cubic feet per hour of $SO_2$ and 15 cubic feet per hour of air to the pipes 24 and 24' in the presence of a catalyst which promotes the formation of $SO_3$. Openings 23 in the pipes 24 and 24' were approximately 1" apart and extended from side to side of the path of travel of the ribbon. The flow of $SO_3$ gas through the holes was approximately 20 cubic feet per hour.

As indicated above, $SO_3$ gas supplied by the pipes 24 and 24' not only contacted the undersurface of the ribbon 9 directly but was also carried by the natural air currents in the lehr around the glass and toward the hot end of the lehr to concentrate in the upstream atmosphere so that good contact of the gas with the glass was obtained under excellent conditions of temperature and time.

With the pipe arrangement discussed above, an additional pipe 24" was provided between the second and third lehr roll immediately adjacent the hot end of the lehr for use in the event that additional exposure to $SO_3$ vapors at high temperatures appeared necessary to complete control of the defect. It was found unnecessary to employ the added pipe but its presence was considered to be of value as a safety factor.

It will be appreciated that, although it appears particularly advantageous to carry out the $SO_3$ treatment in the lehr or annealing zone of the float glass apparatus, the treatment can also be carried out at any location in advance of the lehr where the ribbon is lifted from the metal bath sufficiently to permit exposure of its undersurface to $SO_3$ vapors, for example, in or after the lift-out zone 25 or earlier. Similarly, the glass may be treated outside of the float glass apparatus and after it has been annealed, by reheating in the presence of $SO_3$ vapors at any time before, or even during, the preheating that is part of the heat-fabricating or heat-processing procedure.

Moreover, while the particular times and temperatures given in the examples completely eliminated the development of the defect during any subsequent, conventional heat-fabricating of the glass, it has been found that the $SO_3$ treatment even at less than an optimum time and temperature, anywhere within the ranges of 500° and 1250° F. for more than 1 minute, will notably reduce and may minimize to a commercially acceptable extent the development of the defect upon subsequent reheating.

Obviously, too, this invention is not limited to float glass but can be used wherever contact with a batch of molten tin, or other metal suitable for the purpose, during a formative period, renders glass subject to surface defects resulting from reheating. Nor is the invention restricted to any particular way of producing $SO_3$ vapors or of bringing them into contact with the glass surface.

I claim:

1. In a method of producing flat glass by a process in which a newly formed ribbon of glass is supported upon and moved over a bath of molten metal containing molten tin whereby stannous oxide from said bath diffuses into the surface of said ribbon in contact with said bath and said ribbon is lifted from said bath and subsequently passed into an annealing zone, the improvement comprising exposing the surface of said ribbon containing said stannous oxide to sulfur trioxide vapors after said ribbon is lifted from said bath to convert the available sodium oxide to sodium sulfate and deplete the surface layer of the glass of sodium oxide, whereby development of an iridescent haze on said surface during subsequent reheating of said glass for fabrication is avoided.

2. A method as defined in claim 1, in which said annealing zone is substantially enclosed, and said ribbon is exposed to said sulfur trioxide vapors in said annealing zone in a concentration not materially below 2% before the glass in said ribbon has cooled below 500° F.

3. A method as defined in claim 2 in which said ribbon is exposed to a concentration of said sulfur trioxide vapors above 2% for more than 1 minute at a temperature above 500° F.

4. A method as defined in claim 1 in which said sulfur trioxide vapors are directed toward the lower surface of said ribbon.

5. A method as defined in claim 2 in which said sulfur trioxide vapors are continuously directed toward a part of said ribbon that is in said annealing zone and while the glass therein is still at a temperature above 500° F.

6. A method as defined in claim 5 in which said sulfur trioxide vapors are directed toward a plurality of longitudinally spaced areas of said ribbon extending across the width thereof.

7. In a method of fabricating flat glass produced by a method in which a surface of said glass, while at a temperature above 1000° F., is contacted by molten tin whereby stannous oxide from said molten tin diffuses into the surface of said glass in contact with said tin, and which fabricating method requires reheating said glass to a temperature above 1000° F., the improvement comprising minimizing the tendency of said glass to develop surface defects when so reheated for fabrication by exposing the surface of said glass containing said stannous oxide to sulfur trioxide vapors at a temperature above 500° F. to convert the available sodium oxide to sodium sulfate and deplete the surface layer of the glass of sodium oxide before performing the reheating step of said fabricating method.

8. A method as defined in claim 7 in which said glass surface is contacted by said vapors for a period between 1 and 15 minutes at temperatures between 500 and 1250° F.

References Cited

UNITED STATES PATENTS

| 3,199,966 | 8/1965 | O'Connell et al. | 65—30 |
| 3,250,604 | 5/1966 | Toytot et al. | 65—65 |
| 3,351,451 | 11/1967 | Barradell-Smith et al. | 65—157 |

S. LEON BASHORE, Primary Examiner

J. H. HARMAN, Assistant Examiner

U.S. Cl. X.R.

65—25, 30, 32, 65, 157, 182